United States Patent [19]

Hummel

[11] Patent Number: 5,013,520
[45] Date of Patent: May 7, 1991

[54] APPARATUS FOR INSERTING FUEL RODS INTO A CAN

[75] Inventor: Wolfgang Hummel, Weisendorf, Fed. Rep. of Germany

[73] Assignee: Siemens Aktiengesellschaft, Munich, Fed. Rep. of Germany

[21] Appl. No.: 393,284

[22] Filed: Aug. 11, 1989

[30] Foreign Application Priority Data

Aug. 24, 1988 [EP] European Pat. Off. ........ 88113815.0

[51] Int. Cl.$^5$ .............................................. G21C 19/32
[52] U.S. Cl. ....................................... 376/261; 53/236
[58] Field of Search .................. 376/261, 272; 53/149, 53/236, 244, 246; 414/146; 29/723, 906, 468; 206/443

[56] References Cited

U.S. PATENT DOCUMENTS

| 4,446,098 | 5/1984 | Pomaibo et al. | 376/261 |
| 4,474,727 | 10/1984 | Kmonk et al. | 376/272 |
| 4,636,351 | 1/1987 | Rohr | 376/272 |
| 4,683,110 | 7/1987 | Baudro et al. | 376/261 |
| 4,723,358 | 2/1988 | Jung et al. | 376/261 |
| 4,842,809 | 6/1989 | Attix et al. | 376/261 |

FOREIGN PATENT DOCUMENTS

| 0005623 | 11/1979 | European Pat. Off. . |
| 0066695 | 12/1982 | European Pat. Off. . |
| 0128236 | 12/1984 | European Pat. Off. . |
| 2556489 | 6/1985 | European Pat. Off. . |
| 3530410 | 3/1987 | Fed. Rep. of Germany . |
| 8505346 | 8/1988 | Fed. Rep. of Germany . |

Primary Examiner—Daniel D. Wasil
Attorney, Agent, or Firm—Herbert L. Lerner; Laurence A. Greenberg

[57] ABSTRACT

An apparatus for the insertion of mutually parallel, elongated fuel rods into an elongated can having a rectangular cross section, a longitudinal direction and a lateral transverse slit formed therein, includes a holder for holding a can. A fuel rod positioning arm has an insertion end for insertion through the slit in the can in an insertion direction at right angles to the longitudinal direction of the can. A support structure is attached to the insertion end of the arm for supporting fuel rods. The support structure has a pivot axis at right angles to the insertion direction of the arm and to the longitudinal direction of the can about which the support structure is pivotable back and forth within a given pivot angle. The support structure has a jacket surface with two fuel rod support surfaces being curved outwardly about the pivot axis and offset alongside one another in the direction of the pivot axis. One of the support surfaces merges from a first segment with a relatively shorter radial spacing from the pivot axis than the other of the support surfaces, into a second segment with a relatively greater radial spacing from the pivot axis than the other of the support surfaces. The radial spacings of the two support surfaces from the pivot axis increases in infinite graduations within the given pivot angle, as seen in opposite directions.

7 Claims, 2 Drawing Sheets

APPARATUS FOR INSERTING FUEL RODS INTO A CAN

The invention relates to an apparatus for the insertion of elongated, mutually parallel fuel rods into an elongated can having a rectangular and in particular square cross section, the apparatus including a holder for the can and a fuel rod positioning arm, the arm having an insertion end for insertion through a lateral transverse slit in the can in an insertion direction at right angles to the longitudinal direction of the can.

With such an apparatus, fuel rods, for instance, from irradiated and spent nuclear reactor fuel assemblies, are inserted into the can in the closest possible packing structure and stored in the can until reprocessing. In this way, both storage space and transport costs can be reduced, as compared with temporary storage of the complete spent nuclear reactor fuel elements. However, such an apparatus is difficult to control.

It is accordingly an object of the invention to provide an apparatus for inserting fuel rods into a can, which overcomes the hereinafore-mentioned disadvantages of the heretoforeknown devices of this general type and which is simpler to control.

With the foregoing and other objects in view there is provided, in accordance with the invention, an apparatus for the insertion of mutually parallel, elongated fuel rods into an elongated can having a rectangular cross section, a longitudinal direction and a lateral transverse slit formed therein, comprising a holder for holding a can, a fuel rod positioning arm having an insertion end for insertion through the slit in the can in an insertion direction at right angles to the longitudinal direction of the can, a support structure attached to the insertion end of the arm for supporting fuel rods, the support structure having a pivot axis at right angles to the insertion direction of the arm and to the longitudinal direction of the can about which the support structure is pivotable back and forth within a given pivot angle, the support structure having a jacket surface with two fuel rod support surfaces being curved outwardly about the pivot axis and offset alongside one another in the direction of the pivot axis, one of the support surfaces merging from a first segment with a relatively shorter radial spacing from the pivot axis than the other of the support surfaces, into a second segment with a relatively greater radial spacing from the pivot axis than the other of the support surfaces, and the radial spacings of the two support surfaces from the pivot axis increasing in infinite graduations within the given pivot angle, as seen in opposite directions.

The support structure for the fuel rods of this apparatus can be positioned quickly and simply in the can. Moreover, by a simple swiveling with the support structure, a row of new guide openings for the fuel rods to be inserted is formed in the can, after the row of guide openings formed previous to the swiveling by the support structure, has been filled with fuel rods.

In accordance with another feature of the invention, there is provided a resilient restoring element, the support structure and the holder being displaceable relative to one another in a direction parallel to the insertion direction of the arm counter to the resilient restoring element.

In accordance with a further feature of the invention, the arm with the support structure and the holder are displaceable relative to one another in the longitudinal direction of the can.

In accordance with an added feature of the invention, the can has another lateral transverse slit formed therein, and there is provided a counterpart structure disposed on the holder opposite the support structure for insertion through the other slit in the can, the counterpart structure having toothing defining gaps in the longitudinal direction of the can.

In accordance with an additional feature of the invention, the counterpart structure is an elongated, rotatable eccentric shaft disposed transversely to the longitudinal direction of the can, the shaft having an outer jacket surface with grooves formed therein in circumferential direction forming the toothing.

In accordance with a concomitant feature of the invention, the counterpart structure has a support surface for retention of the can.

Through the use of these features, insertion of the fuel rods into the can is facilitated.

Other features which are considered as characteristic for the invention are set forth in the appended claims.

Although the invention is illustrated and described herein as embodied in an apparatus for inserting fuel rods into a can, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
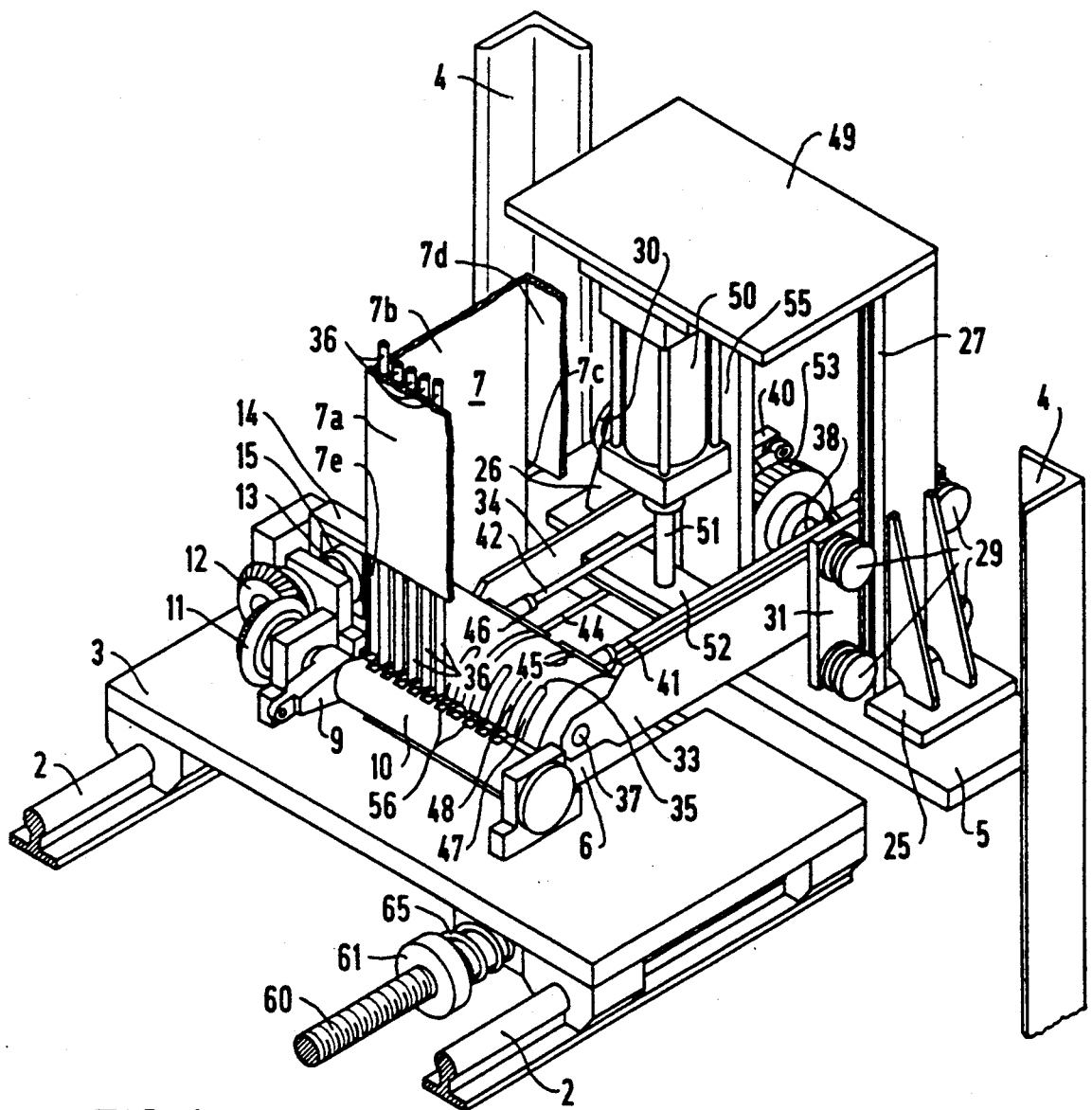
FIG. 1 is a fragmentary, diagrammatic, perspective view of an apparatus according to the invention.
Figure 2:
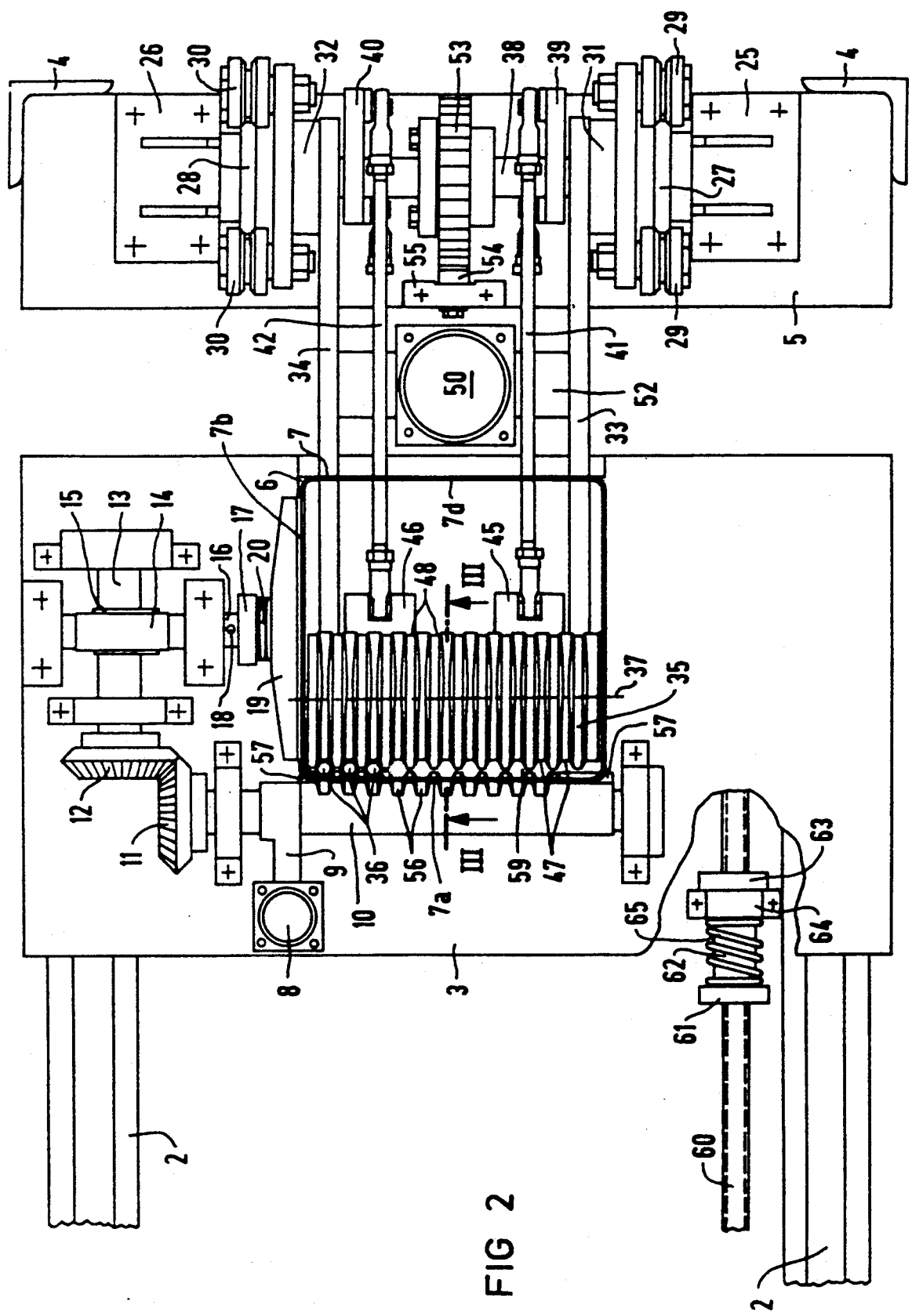
FIG. 2 is an enlarged, fragmentary, top-plan view of the apparatus of FIG. 1.

Referring now to the figures of the drawings in detail and first, particularly, to FIGS. 1 and 2 thereof, there is seen an apparatus having two guide rails 2 for a base plate 3. The guide rails 2 are stationary with respect to a frame 4 on which a support plate 5 is secured.

The base plate 3 has an opening or duct 6 formed therein, through which an elongated can 7 of square cross section extends, so as to form a holder for the can. The longitudinal axis of the can 7 is at right angles to the base plate 3 and to the guide rails 2, which are parallel to one another.

A cylinder 8 that can be acted upon by compressed air is mounted on the base plate 3 and contains a piston that can be displaced at right angles to the base plate 3. A lever 9 is articulated on the piston and secured to an elongated, rotatable eccentric shaft 10. The eccentric shaft 10 has an axis of rotation parallel to the base plate 3 and to one side wall 7a of the can 7, and the eccentric shaft is rotatably supported on the base plate 3 about the axis of rotation thereof.

A bevel gear 11 is also mounted on one end of the eccentric shaft 10, concentrically with the axis of rotation of the eccentric shaft 10. The bevel gear 11 meshes with a further bevel gear 12. The bevel gear 12 is mounted on a shaft 13, which is likewise rotatably supported on the base plate 3 with an axis of rotation parallel to the base plate 3. The axes of rotation of the eccentric shaft 10 and of the shaft 13 are at right angles to one another.

An eccentric 15 guided in a connecting link 14 is mounted on the shaft 13. A hollow rod 16 with a support element 17 is located at the connecting link 14. A non-illustrated die rod is guided inside the hollow rod 16 and secured on the rod 16 by a pin 18. A retaining die 19 is mounted outside the hollow rod 16, on one end of the die rod, and the retaining die is capable of resting flat on a side wall 7b of the can 7 adjacent the side wall 7a. Between the support element 17 and the retaining die 19 on the die rod is a spring assembly being formed of plate springs 20.

Two blocks 25 and 26 are disposed on the support plate 5. A rail 27 is attached to the block 25, and a rail 28 is attached to the block 26. The rails 27 and 28 are at right angles to the support plate 5 and thus to the base plate 3 as well, and they are parallel to the longitudinal direction of the can 7. A carriage 31 or 32, provided with respective guide rollers 29 or 30, is displaceably guided on each rail 27 or 28, respectively, parallel to the longitudinal direction of the can 7.

A respective fuel rod positioning arm 33 or 34 is attached to each carriage 31 and 32. The fuel rod positioning arms 33 and 34 are parallel to the support plate 5 and the base plate 3 and are at right angles to the longitudinal axis of the can 7. Each fuel rod positioning arm 33 and 34 forms an insertion end for insertion into the can 7, through a crosswise slit 7c in the side wall 7d opposite the side wall 7a of the can 7. A support structure 35 for fuel rods 36 to be inserted into the can 7 is attached to the two insertion ends of the fuel rod positioning arms 33 and 34. The support structure 35 is pivotable back and forth about a pivot axis of a shaft 37, which is at right angles to the insertion direction of the fuel rod positioning arms 33 and 34 into the can 7 and at right angles to the longitudinal direction of the can 7. The pivot axis 37 is also parallel to the side walls 7a and 7d of the can 7.

A shaft 38 is supported in both carriages 31 and 32 and is parallel to the pivot axis 37 of the support structure 35. Mounted on the shaft 38 are two levers 39 and 40, each of which has two lever arms. A rod is pivotably connected to each lever arm of the two levers 39 and 40. Of the four rods connected to the lever arms, rods 42 and 44 on the lever 40 and a rod 41 on the lever 39 are seen in FIG. 1. The other ends of the four rods are pivotably connected to holders 45 and 46, which are secured to the side of the support structure 35.

Figure 3:
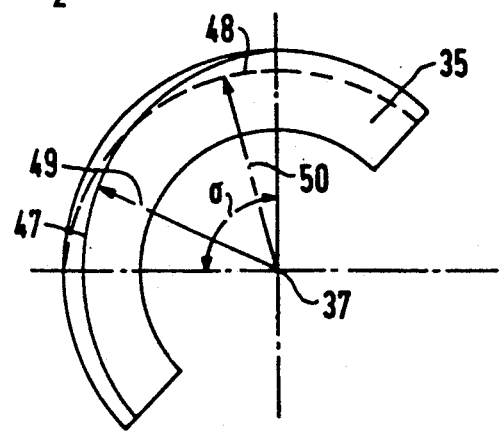
FIG. 3 is a cross-sectional view taken along the dot-dash line III—III in FIG. 2, in the direction of the arrows.

As can be seen particularly from FIG. 3, the support structure 35 is a tubular half-shell. Within a pivot angle sigma as measured from the pivot axis 37, the support structure 35 has a plurality of fuel rod support surfaces 47 and 48 on its jacket surface which are offset from and alongside one another in the direction of the pivot axis 37. One fuel rod support surface 47 changes from a segment in which it has a shorter radial spacing 49 from the pivot shaft 37 than the two fuel rod support surfaces 48 adjacent thereto, into a different segment in which it has a greater radial spacing 49 from the pivot axis 37 than the adjacent support surfaces 48. The radial spacings 49 and 50 of the two adjacent support surfaces 47 and 48 from the pivot axis 37 also increases in an infinitely graduated manner in opposite directions within the pivot angle sigma.

A plate 49' is secured to the blocks 25 and 26 and a cylinder 50' that can be subjected to compressed air is located on the underside of the plate 49'. Inside the cylinder 50' is a piston, which is displaceable at right angles to the support plate 5 and has a piston rod 51 that is secured to a transverse plate 52. The transverse plate 52 is in turn secured to the fuel rod positioning arms 33 and 34.

Finally, a gear wheel 53 that meshes with a rack 54 is mounted on the shaft 38. The rack 54 is mounted on a plate 55, which stands vertically on the support plate 5 and is secured to the support plate 5 and to the plate 49. Thus the rack 54 is likewise at right angles to the support plate 5.

The eccentric shaft 10 is a counterpart structure to the support structure 35. Accordingly, the eccentric shaft 10 has grooves 56 formed therein in the circumferential direction thereof, which form an external toothing on the jacket surface. By rotation of the eccentric shaft 10, these grooves 56 forming the toothing can be inserted into the can 7 through a transverse slit 7e in the side 7a of the can 7. The transverse slit 7e is located at the same height as the transverse slit 7c in the opposite side wall 7d of the can 7. When the grooves 56 of the eccentric shaft 7 forming the toothing are inserted into the transverse slit 7e, a support surface 57 on the jacket surface of the eccentric shaft 10 for holding the can simultaneously presses against the edge of the side wall 7b in the transverse slit 7e.

After the insertion of the can 7 into the opening 6, the cylinder 8 is subjected to compressed air. This rotates the eccentric shaft 10 so that the grooves 56 forming the toothing are inserted into the transverse slit 7e of the can 7. At the same time, the retaining die 19 is pressed externally against the side wall 7b of the can 7, so that the can 7 is firmly retained in a holder formed by the base plate 3, with its longitudinal axis at right angles to the base plate 3.

A spindle 60 is driven by switching on a non-illustrated electric motor. The spindle 60 has a spindle nut 61 associated therewith, which is secured on a tube 62. A stop element 63 is secured to the tube 62. A slide block 64 is displaceably disposed on the tube 62 between the spindle nut 61 and the stop element 63, and secured to the underside of the base plate 3. Mounted on the tube between the spindle nut 61 and the sliding block 64 is a compression spring acting as a resilient restoring element 65, which is braced in a direction toward both the spindle nut 61 and the sliding block 64. The base plate 3 is therefore displaced on the guide rails 2 toward the support plate 5, so that the fuel rod positioning arms 33 and 34 with the support structure 35 pass through the transverse slit 7c of the can 7 into the can 7 until the support structure 35 comes to a stop at the eccentric shaft 10. The support surfaces 47 of the support structure 35 and the grooves 56 of the toothing of the eccentric shaft 10 then form guide conduits 59 in the longitudinal direction of the can 7 on the inner surface of the side wall 7a of the can 7.

The fuel rods 36 are then introduced into these guide channels 59 from the top end of the can 7. The cylinder 50' is then subjected to compressed air, and the piston rod 51 is moved into another of two terminal positions. In this waY the carriages 31 and 32 are displaced on the plate 49'. At the same time, the gear wheel 53 rolls along the rack 54 and pivots the levers 39 and 40. As a result, the support structure 35 is pivoted through the rods 41-44 about the pivot shaft 37 by the pivot angle sigma. The support structure 35 rolls along the fuel rods 36, and with the fuel rods 36 located on the inside of the side wall 7a of the can 7, forms new guide channels in the longitudinal direction of the can 7. Each new guide channel is located between two fuel rods 36 resting on the inside of the side wall 7a. During this pivoting process, the base plate 3, which is the holder for the can 7, is thrust away from the support plate 5 on the guide rails 2 counter to the compression spring acting as the resilient restoring element 65.

Further fuel rods are thereupon inserted into the new channels. Next, after the electric motor is switch on, the compression spring is relieved by moving the base plate 3 toward the guide rails 2, away from the base plate 5. Thereupon the cylinder 50' is subjected to compressed air in such a way that the piston rod 51 moves to its opposite terminal position. As a result the support structure 35 pivots back again by the pivot angle sigma and rolls along the fuel rods located in the can 7 into the position shown in FIG. 1. As a result, guide channels are again formed in the longitudinal direction of the can 7, between the most recently inserted fuel rods, for the insertion of new fuel rods.

By repeating this alternation and gradually increasing the distance of the base plate 3 from the support plate 5, the can 7 can finally be completely filled with fuel rods in a close-packed structure.

The foregoing is a description corresponding in substance to European Application 88 11 3815.0, dated Aug. 24, 1988, the International priority of which is being claimed for the instant application, and which is hereby made part of this application. Any material discrepancies between the foregoing specification and the aforementioned corresponding German application are to be resolved in favor of the latter.

I claim:

1. Apparatus for the insertion of mutually parallel, elongated fuel rods into an elongated can having a rectangular cross section, a longitudinal direction and a lateral transverse slit formed therein, comprising a holder for holding a can, a fuel rod positioning arm having an insertion end for insertion through the slit in the can in an insertion direction at right angles to the longitudinal direction of the can, a support structure attached to said insertion end of said arm for supporting fuel rods, said support structure having a pivot axis at right angles to the insertion direction of said arm and to the longitudinal direction of the can about which said support structure is pivotable back and forth within a given pivot angle, said support structure having a jacket surface with two fuel rod support surfaces being curved outwardly about said pivot axis and offset alongside one another in the direction of said pivot axis, one of said support surfaces merging from a first segment with a relatively shorter radial spacing from said pivot axis than the other of said support surfaces, into a second segment with a relatively greater radial spacing from said pivot axis than the other of said support surfaces, and said radial spacing of one of said two support surfaces from said pivot axis increasing steadily within said given pivot angle, and said radial spacing of the other of said two support surfaces from said pivot axis decreasing steadily, as seen in the same circumferential direction.

2. Apparatus according to claim 1, including a resilient restoring element, said support structure and said holder being displaceable relative to one another in a direction parallel to said insertion direction of said arm counter to said resilient restoring element.

3. Apparatus according to claim 1, wherein said arm with said support structure and said holder are displaceable relative to one another in the longitudinal direction of the can.

4. Apparatus according to claim 1, wherein the can has another lateral transverse slit formed therein, and including a counterpart structure disposed on said holder opposite said support structure for insertion through the other slit in the can, said counterpart structure having toothing defining gaps in the longitudinal direction of the can.

5. Apparatus according to claim 4, wherein said counterpart structure is an elongated, rotatable eccentric shaft disposed transversely to the longitudinal direction of the can, said shaft having an outer jacket surface with grooves formed therein in circumferential direction forming said toothing.

6. Apparatus according to claim 4, wherein said counterpart structure has a support surface for retention of the can.

7. Apparatus for the insertion of mutually parallel, elongated fuel rods into an elongated can having a rectangular cross section, a longitudinal direction and a lateral transverse slit formed therein, comprising a holder for holding a can, a fuel rod positioning arm having an insertion end for insertion through the slit int eh can in an insertion direction at right angles to the longitudinal direction of the can, a support structure attached to said insertion end of said arm for supporting fuel rods, said support structure having a fuel rod support surface disposed thereon, and having a pivot axis at right angles to the insertion direction of said arm and to the longitudinal direction of the can about which said support structure is pivotable back and forth within a given pivot angle.

* * * * *